Dec. 13, 1960 R. C. COURTOT 2,964,345
LATCH FOR VEHICLE DOORS
Filed Jan. 15, 1957 4 Sheets-Sheet 1
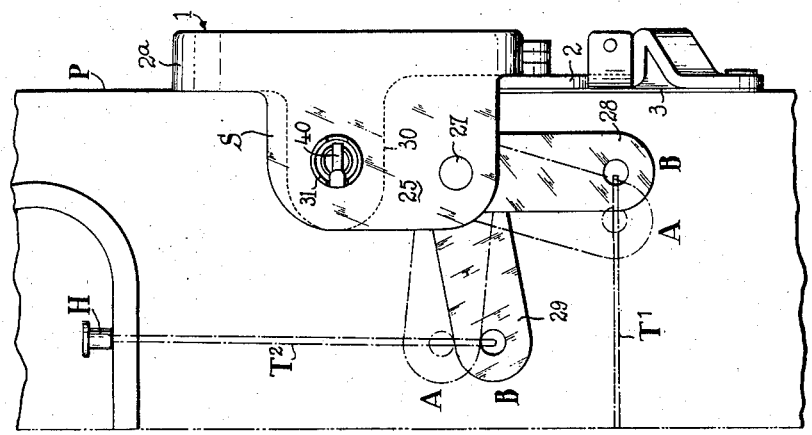
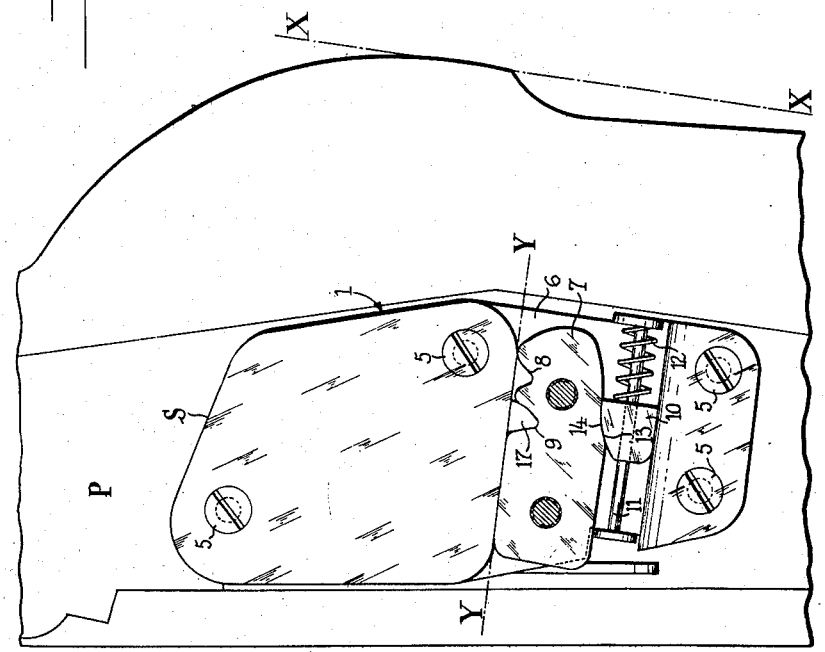
INVENTOR:
RENE CHARLES COURTOT
By
Richardson, David and Nardon
ATTY'S.

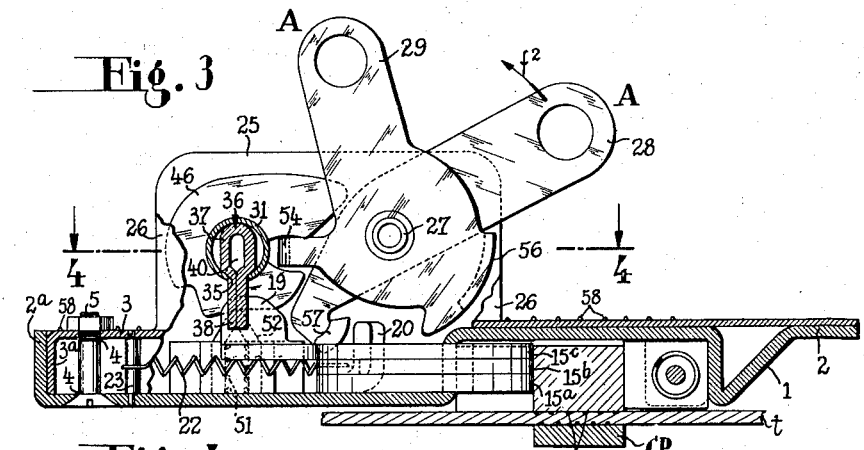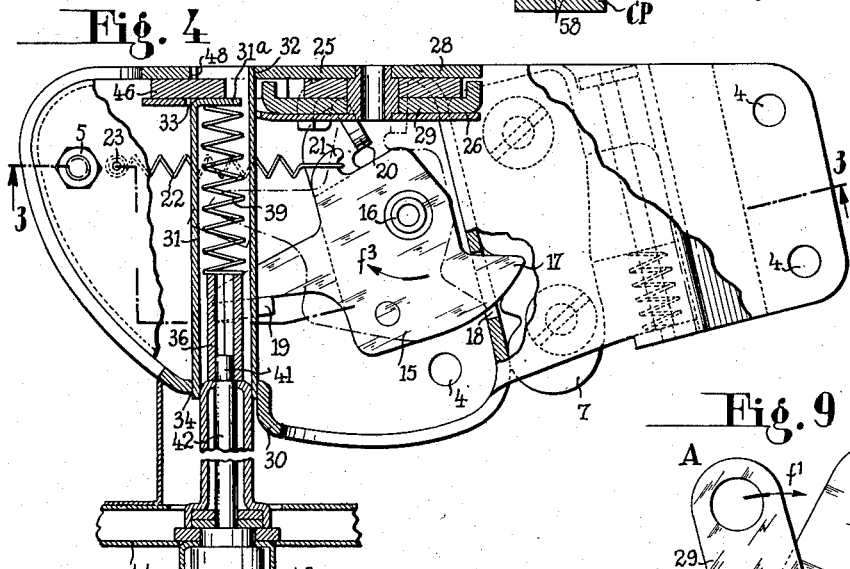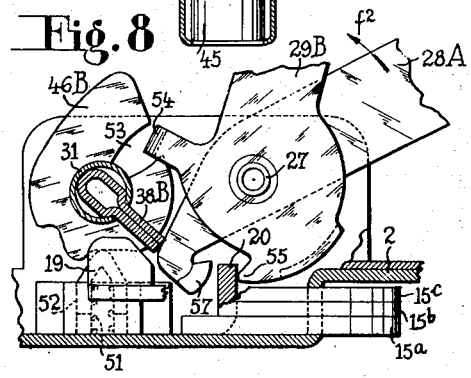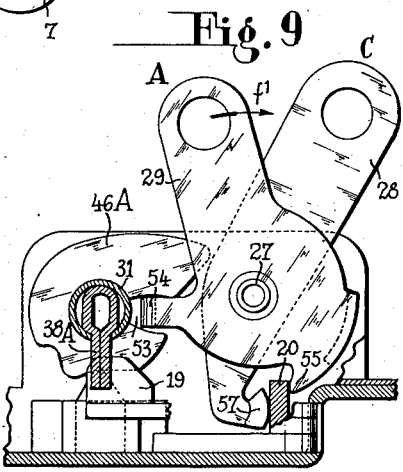
INVENTOR:
RENÉ CHARLES COURTOT

Dec. 13, 1960 R. C. COURTOT 2,964,345
LATCH FOR VEHICLE DOORS
Filed Jan. 15, 1957 4 Sheets-Sheet 3
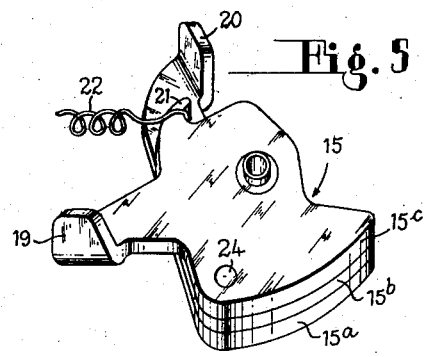
Fig. 5
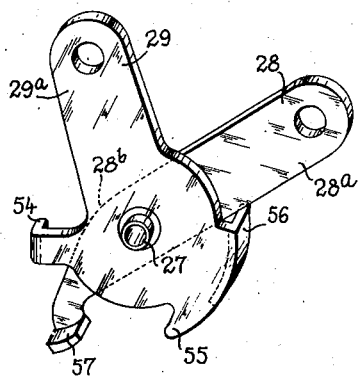
Fig. 6
Fig. 7
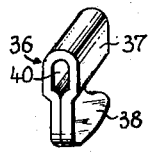
Fig. 10
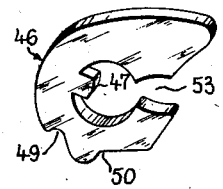
INVENTOR:
RENE CHARLES COURTOT
BY
Richardson, David and Nerdon
ATTYS.

Dec. 13, 1960  R. C. COURTOT  2,964,345
LATCH FOR VEHICLE DOORS
Filed Jan. 15, 1957  4 Sheets-Sheet 4
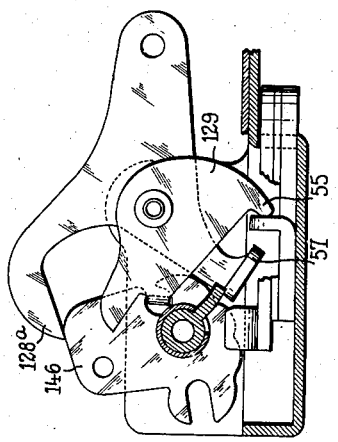
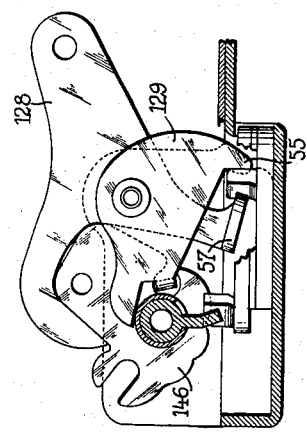
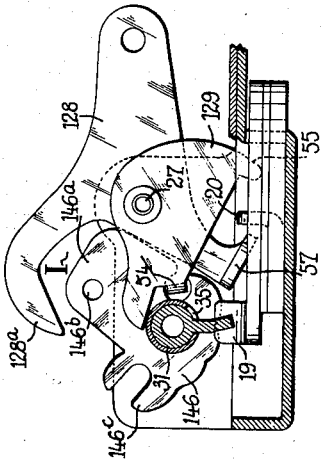
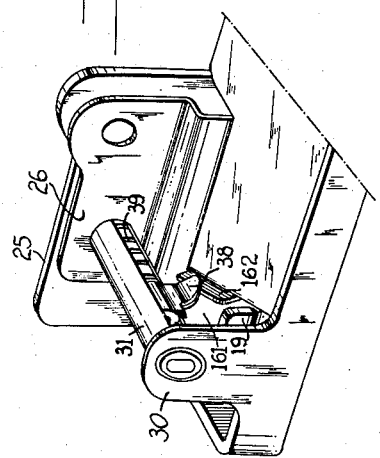
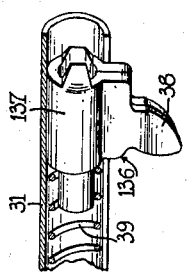
INVENTOR:
RENE CHARLES COURTOT
By
Richardson, David and Nordon
ATTYS

United States Patent Office 2,964,345
Patented Dec. 13, 1960

2,964,345

LATCH FOR VEHICLE DOORS

René Charles Courtot, Neuilly-sur-Seine, France, assignor to Sté Ame Maglum, Sochaux (Doubs), France, a French body corporate Filed Jan. 15, 1957, Ser. No. 634,296

Claims priority, application France Jan. 27, 1956

13 Claims. (Cl. 292—223)

The present invention relates to latches for vehicle doors of the type comprising a keeper, formed by a notched block usually fixed to the frame against which the door is closed, and a bolt-carrying part generally fixed to the door itself, said latch comprising a case and a rotary bolt or latch mounted in the case and provided with a nose, this bolt being urged in rotation by a spring so that the nose protrudes from the case and is capable of co-operating with the notches in the keeper so as to hold the door in a closed position, said bolt being rotatable to its door opening position either by the action of a push button, usually disposed in the door handle fixed on the outer face of the door near the latch, or by the action of a turnable handle mounted on the inner face of the door.

A latch of this type has been described in the U.S. Patent No. 2,804,331 issued on an application filed on November 23, 1954, by R. Courtot.

Considerations of safety and sometimes official regulations require that the user of the vehicle be able to enter and leave the vehicle by the nearside door, namely that nearest the pavement, irrespective of the side of the road on which the vehicle is stationed, without having to open the offside door. It is also advantageous that the user be able to lock the offside door by an operation effected from inside the vehicle without having to walk over a part of the road to close this door from the exterior, and, furthermore, that the user, after having closed the nearside door, be able to lock it by an operation effected from outside the vehicle by means of a key inserted in an offside or nearside door.

Further, in the event of the user accidentally putting the latch in its locking position before closing the door, the door should not be automatically locked, which could be very inconvenient if the user does not possess the door key and especially if the key happens to be inside the vehicle. It is therefore necessary that in this event the closure of the door automatically puts the latch in its non-locking position.

In the event of an occupant of the vehicle, for example a child, putting the latch in its locking position, this latch should also be capable of being unlocked from outside the vehicle.

The object of the present invention is to provide a latch of the above-mentioned type in which the various above-mentioned desirable features are incorporated. This latch has the following possibilities and advantages:

(a) The latch may be opened from outside the vehicle by exerting pressure on a push button, closes automatically and may be opened from within the vehicle by means of a door handle.

(b) The latch may be locked from outside the vehicle by means of a key and from within the vehicle by means of a handle and, preferably, also by means of a special locking button which may be, for example, arranged to permit locking the latch from a distance.

(c) Said two outside and inside locking means are combined in such manner that a latch locked from outside the vehicle may be unlocked from inside the vehicle and, conversely, a latch locked from inside may be unlocked from outside the vehicle.

(d) When the latch is in its locking position, the action of the keeper on the nose of the bolt in the course of closing the door automatically unlocks the latch, so that the latter may then be opened from inside or outside the vehicle, as mentioned above.

In the latch embodying the invention, the driving action on the rotary bolt, resulting from sliding the control button, is exerted by thrust means connected to the button and moving in translation with the latter, said thrust means being turnable about the axis of translation of the button so as to be brought by means of the latch key either into an operative position, in which in the course of its translation the thrust means abuts a lug of the rotary bolt and causes the latter to turn to the open latch position, or into an inoperative position or locking position, in which the thrust means is spaced away from the lug of the rotary bolt, the latter being no longer in the path of translation of the thrust means, so that the button, when depressed, no longer causes co-operation between the thrust means and the lug and is therefore inoperative.

Further features and advantages of the invention will be apparent from the ensuing description with reference to the accompanying drawings, to which the invention is in no way limited.

In the drawings:

Fig. 1 is a view of the latch positioned on the end of a vehicle door;

Fig. 2 is a view of the latch shown in Fig. 1, the door being shown in side elevation as viewed from within the vehicle;

Fig. 3 is a side elevational view of the latch with a part shown in section taken along line 3—3 of Fig. 4;

Fig. 4 is a plan view of the latch with a part shown in section taken along line 4—4 of Fig. 3;

Figs. 5, 6 and 7 are perspective views of some elements of the latch;

Figs. 8 and 9 are partial views of the latch similar to that of Fig. 3, the latch elements being in different positions;

Fig. 10 is a perspective view of one of the elements of the latch;

Fig. 11 is a side elevational view of a part of a modification of the latch, the latch being in a closed but unlocked position;

Fig. 12 is a view similar to that of Fig. 11, the latch being in its open position;

Fig. 13 is a view similar to that of Fig. 11, the latch being locked;

Fig. 14 is a perspective view, with a part cut away, of a modification of the thrust means, and Fig. 15 is a perspective view of a modification of the case of the latch.

In the embodiment shown in the drawings, the latch, generally designated by the reference character S (Figs. 1 and 2), comprises a mounting plate or case 1 which includes a plate 2 the edges of which are formed up to constitute a flange 2ª, and is closed by a cover 3 which comprises, along a part of its periphery, a formed-up portion 3ª (Fig. 3) which fits into the plate 2. The case is provided with holes 4 which are formed in the cover 3 and in the plate 2 in aligned relationship and enable the cover to be fixed to the plate and the latch to be fixed to the support therefor by means of screws or bolts 5. One side of the case, namely the underside in the position shown in Fig. 3, which forms the end face of the latch when the latter is mounted on the end of a door P, as shown in Figs. 1 and 2, is provided with a recess 6 which has a generally parallelepipedic shape adapted to receive the keeper 7 when the door is moved to its closed position (Fig. 1). This keeper, which is known per se and is formed of a metal block, is usually rigidly secured to the frame adjoining the door and extends into the recess 6 owing to the relative movement between the latch and this keeper when the door turns about the axis X—X of its hinges, the plane Y—Y in which the face of the keeper bears against the latch being perpendicular to the axis X—X. The keeper 7 has a first recess or notch 8 which serves to retain the door, and a second recess 9 which holds the door in a properly closed position, these two recesses co-operating, in the course of the closing movement of the door, with the nose of the rotary bolt, as will be described hereinafter. This keeper also co-operates with a door wedging or blocking means of known type comprising a "nylon" block 10 which slides along a rod 11 and is spring-loaded by a spring 12. The keeper has an inclined portion 13 which bears against a ramp 14 of matching shape formed on the block 10.

Disposed on the other side of the plate 2 inside the case (see Figs. 3 and 4), is the mechanism of the latch comprising, in particular, a rotary bolt or latch 15 turnable about a pivot pin 16 mounted between the plate 2 and the cover 3. This rotary bolt comprises a nose 17 which extends into the recess 6 through an opening 18 formed in the wall of the plate 2 and co-operates, in the course of closing the door, with the recesses 8 and 9 of the keeper 7, when the latch is in the closed position shown in Fig. 1.

The bolt 15 further comprises two formed-up portions, forming tabs 19 and 20 whose shapes are more clearly seen in Fig. 5 and whose function will be explained hereinunder, and a lug or hook 21 serving to secure one end of a return spring 22, the other end of which is fixed to the plate 2 at 23, this spring urging the bolt to turn about the pin 16 toward its latch closing position shown in Fig. 4. As seen in Figs. 3 and 5, this bolt preferably consists of three pieces 15$^a$, 15$^b$, 15$^c$, which are cut out, formed up and united by a rivet 24, thereby forming a relatively cheap and simple bolt.

From the foregoing, it is clear that the bolt 15 may be rotated in a clockwise direction (as seen in Fig 4) by an action on the tab 19 or the tab 20 or by a relative movement between the keeper 7 and the nose 17 when the keeper enters the recess 6. The action on the tabs 19 and 20 is effected by operating and locking means which will now be described.

The plate 2 has a formed-up vertical portion forming an auxiliary plate 25 and the cover 4 has a similar portion 26 parallel to the auxiliary plate 25. These two portions 25 and 26 form an auxiliary mounting plate disposed on the side of the latch and in which are mounted, for pivotal movement about a common pivot pin 27, a first or actuating lever 28 and a second or locking lever 29. These two levers extend out of the latch, as shown in Figs. 2 and 3. The lever 28 is connected, for example by a rod T$^1$, to the door handle (not shown in the drawings) which is mounted on the inside of the door of the vehicle and permits turning the lever 28 about the pin 27. The lever 29 is connected, for example by a rod T$^2$, to a locking member H which may be disposed at any distance from the latch and may consist of a push button permitting pivoting the lever 29 about the pin 27. The assemblage of the levers 28 and 29 and the pin 27 is shown in Fig. 6; the details of construction will be explained hereinunder.

The latch case also comprises, on the side thereof remote from the auxiliary plate 25, 26, a support tab 30 parallel with the plates 25 and 26. This tab is shown in cross-section in Fig. 4 and in dotted line in Fig. 2. A tube 31 is mounted in apertures 32 and 33 in the auxiliary plate and in an aperture 34 in the support 30, these three apertures being coaxial. Thus the tube 31 is rotatable about its axis in the plates 25 and 26 and the support 30, which serve as bearings for the tube. The latter is closed at its inner end 31$^a$, relative to the outside of the vehicle, and includes a longitudinally extending slot 35. Thrust means 36, consisting of a tube 37 slidable in the tube 31 and an actuating or thrust member 38 extending through the slot 35 (see Fig. 7), is urged outwardly of the vehicle by a compression spring 39 housed in the tube 31, the outward movement of the thrust means being limited by the wall of the support 30. The thrust means has in its end remote from the spring 39 a non-circular aperture 40 which has, for example, a rectangular cross-sectional shape and co-operates with the flat end 41 of a rod 42 connected to a push button extending through the door and slidably mounted, as known per se, in a fixed door handle 44 fixed to the outside wall of the door. The flat end 41 may be turned by means of a key inserted in a barrel 45, of known type, disposed in the push button. Rotation of the end 41 causes rotation of the tube 31 and the elements contained therein about the longitudinal axis of the tube, the thrust member 38 of the thrust means being therefore capable of taking up an operative position A, shown in Fig. 3 at 38 and in Fig. 9 at 38$^A$, or a locking position B, shown in Fig. 8 at 38$^B$.

In position A, the thrust member 38 is positioned in front of the tab 19 of the rotary bolt, so that when the thrust member is moved axially it abuts the tabs 19 and turns the bolt. When the thrust member 38 is in the position B, the tab 19 is outside its path of movement and the axial movement of the thrust member 38, caused by depressing the push button 43, has no action on the bolt. The latch is then in the locked position.

Fixed at the rear end of the tube 31 (see Fig. 4) in any suitable manner is a flat member or cam 46 whose shape is better seen in Fig. 10. The cam is for example fixed to the tube 31 by a lug 47 which extends into an aperture 48 formed in the end of the tube 31 so that the cam 46 and the latter rotate together. The cam 46 comprises (Fig. 10) two recesses 49 and 50 which are co-operable with a locking or retaining device consisting of a sliding member spring-pressed by a spring 51, this member being a ball or preferably a V-shaped member 52 (Fig. 8) of special wear-resistant steel. The cam also comprises an aperture 53 which engages with a finger 54 formed in an extension on the lever 29, so that in moving the lever 29 from position A (Fig. 9) to position B (Fig. 8) in the direction of arrow $f_1$ (Fig. 9), the cam is caused to move from position A to position B, which in turn moves the thrust member 38 from its operative position A to its latch-locking position B.

The lever 29 is provided with a nose 55 which assumes, in position B (Fig. 8), a position adjacent the tab 20 of the rotary bolt.

The lever 29 is provided with a portion 56 which is formed up at a right angle relative to the plane of the lever and serves as an abutment for the lever 28. When the lever 29 is in position B (Fig. 8), the lever 28 is capable of assuming a position in which it is substantially parallel with the plate 2 and abuts the portion 56 of the lever 29. This position of the lever 28 is also generally designated by the reference character B. The lever 28 has a portion 28$^a$ (Fig. 6), an arcuate portion 28$^b$ the centre of which coincides with the centre of the pin 27, and a projection 57 oriented in such manner that when the lever 28 is in position A shown in Fig. 8, the projection 57 is in the vicinity of the tab 20 so that rotation of the lever 28 from position A in the direction of arrow $f^2$ (Fig. 3 or 8), causes co-operation between the projection 57 and the tab 20 and a resultant movement of the rotary bolt in the direction of arrow $f^3$ (Fig. 4), namely in the direction for opening the latch, the nose 17 withdrawing within the latch case and thus releasing the keeper 7, The latch operates in the following manner:

Assuming that the levers 28 and 29 are in position A, shown in Fig. 3, the thrust member 38 is in its operative position A. If the push button 43 outside the vehicle is depressed, the thrust member 38 slides axially and shifts the tab 19 which turns the bolt 15 and disengages the nose 17 from the keeper 7. The door may now be opened by pulling on the door handle fixed thereto.

To open the latch from inside the vehicle, the inside door opening handle is actuated so as to pivot the lever 28 in a counter-clockwise direction (arrow $f^2$, Fig. 3) toward position C (Fig. 9) and cause the projection 57 to shift the tab 20. This movement of the lever is made possible by the provision of the arcuate portion 28$^b$. It can be seen that this movement is not hindered by the cam 46.

The latch may be locked from inside or outside the vehicle. In the first case, the lever 29 is moved from position A (Fig. 9) to position B (Fig. 8) by acting on the member connected to this lever, for example on the push button H. This movement pivots the cam 46 from its position A to position B and the thrust member 38 moves from position A to position B. Depressing the push button 43 now has no effect on the latch.

In the event of the door being slammed closed, for example accidentally, with the latch in its locked position, the keeper 7 engages the nose 17 and turns the rotary bolt in the direction of arrow $f^3$ (Fig. 4). The tab 20, which is then in contact with or in the immediate vicinity of the lever 29, turns the latter in the direction of arrow $f^2$ (Fig. 8) and brings it to position A (Fig. 9) which has for effect to turn the cam 46 and bring it to position A and to return the thrust member 38 to its operative position A so that the latch may be once again opened from outside the vehicle.

To lock the latch from outside the vehicle, it is merely necessary to engage a key in the barrel and to turn the thrust member 38 from position A to position B.

It will be observed that the arrangement of the levers 28 and 29 is such that when they are in position A (Figs. 2 and 3) and the lever 28 is moved in the opposite direction to arrow $f^2$ to position B, namely the locking position, the lever 28$^c$ moves the abutment 56 on the lever 29 and causes the latter to move to position B, the lever 29 in turn acting on the cam 46 which moves the tube 31 so as to put the latch into its locked position.

When the lever 29 is in position B (Fig. 8), the lever 28 is free to move from position A to position B or vice versa without acting on any member. However, in moving in the direction of arrow $f^2$ beyond position A to the position C, the lever 28 actuates, as explained above, the rotary bolt which it moves to its open position. Further, the lever 28 causes the lever 29 to be returned to position A by the action of the tab 20 on the nose 55, as can be clearly seen from Fig. 9.

Thus the latch is both unlocked and opened in one operation.

It is therefore clear that the latch of the invention has all the above-mentioned desirable features and consists of very few elements which are simple and cheap to manufacture. Moreover, the latch is very sure in operation.

It should be mentioned, in particular, that as the push button moves and is guided in the latch, the mounting of the push button in the fixed door handle may be a very simple arrangement, since very strong guiding means are no longer required. This permits adopting a very cheap construction for the door handle.

The construction of the push button itself may be simplified, since it includes no spring, the push button being returned by the spring 39 housed in very simple manner in the tube 31.

If it is not desired to use a special latch locking means, such as the button H, the arm 29$^a$ of the lever 29 may be dispensed with, the lever being then reduced to its central portion provided with the finger 54, the nose 55 and the abutment 56. In this case, the door is normally locked from inside the vehicle through the lever 28 by means of the inside door handle as explained above, the lever 28 locking the latch through the medium of the lever 29 as in the previously described latch.

According to a modification of the invention, shown in Figs. 11 to 13, the latch of the invention can be constructed in another way which permits a smoother latch operation. The connection between the latch actuaing lever and the locking lever then is modified in such manner that when the latch is put into its locked position, the inside latch actuating handle is blocked so that the door cannot be opened from inside the vehicle without previously unlocking the latch. Other modifications shown in Figs. 14 and 15 consist in improving the action of the thrust member and preventing any false operation of the latter.

The latch embodying the modification shown in Figs. 11 to 13 and the latch embodying the modifications shown in Figs. 14 and 15 are in a general way similar to the above-described latch (shown in Figs. 1 to 10). It is therefore unnecessary to show certain elements which have not been modified. When the unmodified elements are shown in Figs. 11 to 15, they carry the same reference numerals as those shown in Figs. 1 to 10; the modified elements carry the same reference numerals as the corresponding elements in Figs. 1 to 10 increased by 100.

The three elements 128, 129, 146, which incorporate the main modifications and are shown in Figs. 11 to 13, will be described first.

As in the latch just described, the latch actuating lever 128 is pivotably mounted on the pivot pin 27 and includes a nose 57 capable of acting on a tab 20 rigid with the rotary bolt. The latch locking lever 129 is also pivotably mounted on the pin 27 and is engaged by a finger 54 with a cam 146 rigidly connected to the rotatable tube 31 in which is slidable the thrust member 38 which is capable of acting on the tab 19 rigid with the rotary bolt.

These elements have been modified in the following respects relative to those of the previously described latch.

The cam 146 is provided with an extension 146$^a$ permitting a direct actuation of this cam, for example by means of a push button connected thereto by a rod pivotably mounted in an aperture 146$^b$ in the cam. If the movement of this cam must be transmitted to the cam of another latch, the cam may be provided with a second arm or extension 146$^c$. This would be the case, for example, if the latch were used in the device described in the co-pending U.S. patent application Serial No. 624,618 filed on November 27, 1956, and now abandoned.

The locking lever 129, having no actuating arm, can no longer be directly actuated and forms a simple movement transmitting means between the tab 20 of the bolt and the cam 146. It will be termed hereinunder the intermediate member 129.

The latch actuating lever 128 includes an arm as in the previously described latch, a projection 57 and an abutment 128$^a$ which serves to block the latch actuating handle when the latch is in the locked position.

This arrangement of levers operates in a manner similar to that of the previously described latch, with the following differences:

When the cam 146 is in the unlocked latch position (Fig. 11), the lever 128 is capable of shifting the tab 20 through the medium of its projection 57, and moving the rotary bolt, the extension 146$^a$ of the cam 146 placing itself in the recess I defined by the abutment 128$^a$ and the main part of the actuating lever 128 (Fig. 12).

If the cam 146 is moved to the latch locking position (Fig. 13), which may be effected by acting directly on one of the cam portions 146$^a$ or 146$^c$, the locking is effected as in the previously described latch by rotating the tube 31 (it will be recalled that the tube is rotatable either by the cam or by the latch locking key, rotation of the tube modifying the orientation of the thrust member 38). The cam 146 turns the intermediate member 129 the nose 55 of which bears against the tab 20 of the rotary bolt.

Further, it is clear from Fig. 13 that the portion 146ª of the cam places itself in the path of the abutment portion 128ª and prevents any rotation of the lever 128. Thus in this position it is impossible to open the latch by means of the lever 128, that is by means of the inside door handle.

To open the latch, it is therefore necessary first to bring the cam 146 to its unlocked latch position, either by acting from inside the vehicle on the rod or push button connected to this cam or by rotating the tube 31 from outside the vehicle by means of the key so as to turn the cam 146, as in the previously described latch.

With this type of latch, the door cannot be opened from inside the vehicle by a single movement of the door handle, it being necessary first to unlock the latch.

This may be advantageous when the latch is locked from a distance by an authorized person. It can be seen that, as is the case with the previously described latch, if the latch is put into its locked position with the door open and the latter is slammed closed, the rotary bolt, which is turned upon contact with the keeper 7, acts through the medium of the tab 20 on the nose 55 of the intermediate member 129 and turns the latter, as a result of which the cam is turned and the latch unlocked. The latch may then be locked from outside the vehicle by means of a key. This arrangement makes it impossible to lock the doors with the key inside the vehicle.

In another modification of the invention shown in Fig. 14, the thrust member 38 is free to turn to a certain extent relative to the tube 31 in which it is mounted, the slot 35 being shaped accordingly. The tube 137 on which the thrust member 38 is mounted is cylindrical instead of having the flat-sided shape of tube 37 (Fig. 3). The thrust means 136 tends to turn about the axis of the tube 37 under the effect of torsion of the spring 39 housed in the tube 31, this spring having one of its ends fixed in the tube 31 and the other in the thrust means 136.

This freedom of movement facilitates the action of the thrust member on the tab 19 of the rotary bolt, in the course of movement of the latter, and avoids any wedging effect.

In another modification of the invention shown in Fig. 15, the cover of the latch is provided, along the edge of the opening 161 in which the thrust member 38 moves, with a flange 162 which extends along a portion of the opening at the rear of the tab 19 in the closed position of the latch. The size of this flange is such that when the thrust member 38 is in the locked latch position (if in wishing to turn it to the unlocked latch position it is accidentally urged back before it is turned to the unlocked latch position, the rotational movement thereof to the latter position is impossible because the thrust member abuts the flange 162 and is thus prevented from placing itself at the rear of the tab 19. In this way the user is warned of his false operation.

It should be understood that, when in the normal operative position (Figures 3 and 4), the thrust member 38 is turned about the axis of the tube 31 so that this thrust member is positioned in the space between the bolt tab 19 and the housing tab 30 (Figure 15). The applicant points out that, due to the perspective showing in Figure 15, that this may not look possible because the space between the two tabs appears somewhat too narrow for the insertion of the member 38 therebetween. However, when placed in such operative position, the thrust member 38, when pushed along the axis of the tube 31, will exert a pressure on the bolt tab 19 and will thus actuate the tab and consequently operate the bolt.

On the other hand, if the thrust member 38 is in a locking position (i.e. not in front of the tab 19 but inclined as shown in Figure 15) if the user, wishing to turn said thrust member 38 back to its operative position, inadvertently exerts a thrust upon this member against the action of the spring 39 and, while maintaining this spring compressed, turns back the member 38 to its "vertical" position (assuming the housing plate is in a horizontal position as shown in Figure 15), and then releases the spring 39, if it is assumed that no flange 162 is provided, the member 38 will be placed not in front of the tab 19, but behind this tab and, when pushed, will not operate this tab. The user could hardly be aware of this fact.

The flange 162 prevents this false operation, since the user will be aware thereof because he will not be able to turn the member 38 to its normal operative orientation and the user will let the member 38 be forced back to its forward position before rotating said member. The flange 162 does not prevent rotation of the tube and cam when the door is slammed shut since in its normal locking position, the element 38 positioned between the two tabs 19 and 30 can rotate since the flange 162 does not extend into the space between the tabs 19 and 30.

Whatever embodiment of the invention is used, it is advantageous that the surface of certain parts of the cover adapted to be applied against the wall of the door itself or of the door frame, be provided with small projections or spikes 58 (Fig. 3) obtained, for example, by knurling the metal. These projections serve to ensure a secure anchorage of the latch in the supporting wall when the fastening means have been tightened after the latch has been adjusted and put in its correct position. This adjustment serves to compensate for variations in the dimensions of the doors which are inevitable in mass production. These projections are disposed mainly in the areas of the latch in the vicinity of the apertures through which the fastening means extend. To make it possible to adjust the position of the latch, these apertures have an elongated shape. Preferably, and for the same reasons, projections of this type are also provided on the face of the keeper, which is in contact with the metal wall $t$ of the door frame supporting the keeper, and on the inner face of the backing plate CP with which the fastening means for the keeper co-operate.

Although specific embodiments of the invention have been described, many modifications and changes may be made therein without departing from the scope of the invention as defined in the appended claims.

Having now described my invention what I claim as new and desire to secure by Letters Patent is:

1. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, a first tube rotating means operatively connected to the other end of said tube, and a second tube rotating means operatively connected with said first tube rotating means through unidirectional connection means, whereby said second tube rotating means, when rotated in one direction rotates said first tube rotating means which, in turn, rotates said tube to an inoperative position in which said actuating member when translated by the action of said thrust means does not encounter said tab of said bolt.

2. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, a first tube rotating means operatively connected to the other end of said tube, and a second tube rotating means operatively connected with said first tube rotating means through unidirectional connection means, whereby said second tube rotating means, when rotated in one direction rotates said first tube rotating means, which, in turn, rotates said tube to an inoperative position in which said actuating member when translated by the action of said thrust means does not encounter said tab of said bolt, and unidirectional connection means, on said second tube rotating means and said bolt, to swing said bolt to an unlatched position when said second tube rotating means is rotated in the direction opposite to said one direction.

3. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, a cam rigidly fixed at the other end of said tube in a plane perpendicular to said tube, a recess formed in the periphery of said cam, an auxiliary plate, fixed to said housing, adjacent said other end of said tube, parallel to said cam, a first lever and a second lever mounted on said auxiliary plate for pivotal movement about a single axis perpendicular to said auxiliary plate, an abutment provided on said second lever in the path of movement of said first lever, whereby said first lever when rotated in one direction, abuts said abutment and rotates said second lever, and a finger provided on said second lever and engaged with said recess in said cam for turning said cam, said tube and said actuating member about said axis of said tube so that said actuating member is caused to assume an inoperative position in which said actuating member, when translated by the action of said thrust means, does not encounter said tab of said bolt.

4. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, a cam rigidly fixed at the other end of said tube in a plane perpendicular to said tube, a recess formed in the periphery of said cam, an auxiliary plate, fixed to said housing, adjacent said other end of said tube, parallel to said cam, a first lever and a second lever mounted on said auxiliary plate for pivotal movement about a single axis perpendicular to said auxiliary plate, an abutment provided on said second lever in the path of movement of said first lever, whereby said first lever when rotated in one direction, abuts said abutment and rotates said second lever, and a finger provided on said second lever and engaged with said recess in said cam for turning said cam, said tube and said actuating member about said axis of said tube so that said actuating member is caused to assume an inoperative position in which said actuating member, when translated by the action of said thrust means, does not encounter said tab of said bolt; a projection provided on said first lever and a second tab provided on said bolt and engageable by said projection to swing said bolt to an unlatched position when said first lever is rotated in a direction opposite to said one direction.

5. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, a cam rigidly fixed at the other end of said tube in a plane perpendicular to said tube, a recess formed in the periphery of said cam, an auxiliary plate, fixed to said housing, adjacent said other end of said tube, parallel to said cam, a first lever and a second lever mounted on said auxiliary plate for pivotal movement about a single axis perpendicular to said auxiliary plate, an abutment provided on said second lever in the path of movement of said first lever, whereby said first lever when rotated in one direction, abuts said abutment and rotates said second lever, and a finger provided on said second lever and engaged with said recess in said cam for turning said cam, said tube and said actuating member about said axis of said tube, so that said actuating member is caused to assume an inoperative position in which said actuating member, when translated by the action of said thrust means, does not encounter said tab of said bolt; a projection provided on said first lever and a second tab provided on said bolt and engageable by said projection to swing said bolt to an unlatched position when said first lever is rotated in a direction opposite to said one direction; and a nose provided on said second lever, said nose being positioned, when said second lever is in a position corresponding to said inoperative position of said actuating member, adjacent said second tab on the side of the latter remote from said projection, whereby a rotation of said bolt causes rotation of said second lever and thereby rotation of said cam, said tube and said actuating member, so that the latter assumes an operative position in which said actuating member, when translated by the action of said thrust means, engages said tab of said bolt.

6. A latch as claimed in claim 3, wherein notches are provided on the periphery of said cam and retaining means are provided on said housing to engage said notches for retaining said cam selectively in the positions thereof corresponding to said inoperative position, and to an operative position in which latter position said actuating member, when translated by the action of said thrust means, engages said tab of said bolt.

7. In a latch comprising a housing having a mounting plate, a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, resiliently yieldable means arranged inside said tube to urge said thrust means and actuating member away from said tab, a cam rigidly fixed at the other end of said tube in a plane perpendicular to said tube, connecting means on said cam for allowing connection of direct actuating means with said cam, to rotate said tube and said actuating member either to an operative position in which when actuated to slide, said actuating member directly engages said tab and rotates said bolt about its axis to a non-latching position, or to an inoperative position in which, when actuated to slide, said actuating member does not encounter said tab; and a lever pivotably mounted on said housing, a projection provided on said lever and a second tab provided on said bolt and engageable by said projection to rotate said bolt to an unlatched position.

8. In a latch comprising a housing having a mounting plate; a latch bolt mounted in said housing for pivotal movement about a first axis substantially perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, a longitudinally extending slot in said tube, thrust means slidably mounted in said tube and an actuating member which is rigid with said thrust means and extends through said slot radially of said axis of said tube for sliding movement along said slot and is rotatable with said tube about said axis of the latter, said tab being at a distance from said tube axis smaller than the radial dimension of said actuating member, a barrel adjacent one end of said tube and rigid with said thrust means for sliding said thrust means and rotating said actuating member and said tube, resiliently yieldable means arranged inside said tube to urge said thrust means and actuating member away from said tab, a cam rigidly fixed at the other end of said tube in a plane perpendicular to said tube, connecting means on said cam for allowing connection of direct actuating means with said cam, to rotate said tube and said actuating member either to an operative position in which when actuated to slide, said actuating member directly engages said tab and rotates said bolt about its axis to a non-latching position, or to an inoperative position in which, when actuated to slide, said actuating member does not encounter said tab; a recess formed in the periphery of said cam, an auxiliary plate fixed to said housing adjacent said other end of said tube parallel to said cam, a rotatable member and a lever mounted on said auxiliary plate for pivotal movement about an axis perpendicular to said auxiliary plate, a finger rigid with said rotatable member and engaged in the recess in said cam to cause said rotatable member to be rotated by said cam, a projection provided on said lever and a second tab provided on said bolt and engageable by said projection to rotate said bolt to an unlatched position, and a nose provided on said rotatable member, adjacent said second tab, on the side of the latter remote from said projection, whereby a rotation of the bolt from the latched position causes a rotation of said rotatable member and thereby said cam and said actuating member so that the latter assumes said operative position.

9. A latch as claimed in claim 7, wherein an abutment is provided on said lever and is so positioned as to abut said cam when said cam is in a position corresponding to said inoperative position of said actuating member thereby preventing rotation of said lever.

10. A latch as claimed in claim 7, wherein notches are provided on the periphery of said cam and retaining means are provided on said housing to engage said notches for retaining said cam selectively in positions thereof corresponding to said operative and inoperative positions of said actuating member.

11. A latch as claimed in claim 3, wherein notches are provided in the periphery of said cam and spring-pressed retaining means are provided on said housing to engage said notches for retaining said cam selectively in the positions thereof corresponding to said inoperative position, and to an operative position in which latter position said actuating member, when translated by the action of said thrust means, engages said tab of said bolt.

12. A latch as claimed in claim 7 wherein notches are provided in the periphery of said cam and spring-pressed retaining means are provided on said housing to engage said notches for retaining said cam selectively in positions thereof corresponding to said operative and inoperative positions of said actuating member.

13. In a latch comprising a housing having a mounting plate; a latch bolt mounted in said housing for pivotal movement about a first axis perpendicular to said mounting plate, resiliently yieldable means adapted to bias said bolt to a latching position, a tab rigid with said bolt at a position remote from said axis, a tube rotatably supported by said housing, the axis of said tube being orthogonal to said first axis, said tube having a longitudinally extending slot, thrust means slidably mounted in said tube, an actuating member which is rigid with said thrust means and extends through said slot radially of said axis of said tube for sliding movement along said slot and is rotatable with said tube about said axis of the latter, said tab being at a distance from said tube axis smaller than the greatest radial dimension of said actuating member, whereby, in accordance with the pivotal position of said thrust means on said tube axis, said actuating member is capable of assuming selectively either an operative pivotal position in which, when actuated to slide, it directly engages said tab and rotates said bolt about its axis to a non-latching position, or an inoperative pivotal position in which, when actuated to slide, said actuating member does not encounter said tab so that a push on said thrust means is ineffective, a cover plate covering said housing, parallel to said mounting plate, said cover having an elongated aperture provided therein parallel to said slot of said tube, and along which said actuating member may be translated to actuate said bolt tab, and an elongated projection provided on one side of said elongated aperture for preventing said actuating member from being pushed when in said inoperative position and from being thereafter rotated in an improper postiion behind said first tab of said bolt.

References Cited in the file of this patent

UNITED STATES PATENTS

| | | |
|---|---|---|
| 2,131,198 | Tasman | Sept. 27, 1938 |
| 2,270,559 | Rolph et al. | Jan. 20, 1942 |
| 2,313,712 | Jacobi | Mar. 9, 1943 |
| 2,624,606 | Dingman et al. | Jan. 6, 1953 |
| 2,700,290 | Dall | Jan. 25, 1955 |
| 2,804,331 | Courtot | Aug. 27, 1957 |
| 2,870,620 | Allison | Jan. 27, 1959 |